F. A. BRUNS.
Apparatus for Purifying Air.
No. 229,374.  Patented June 29, 1880.
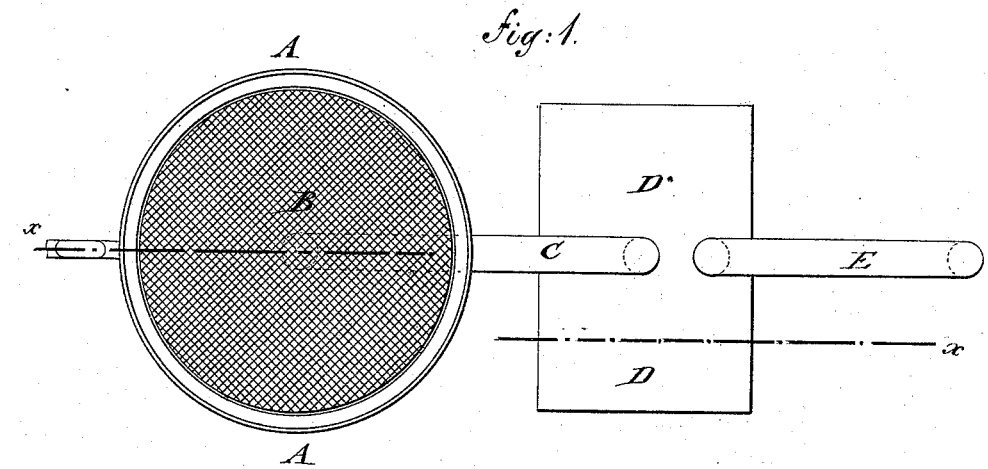
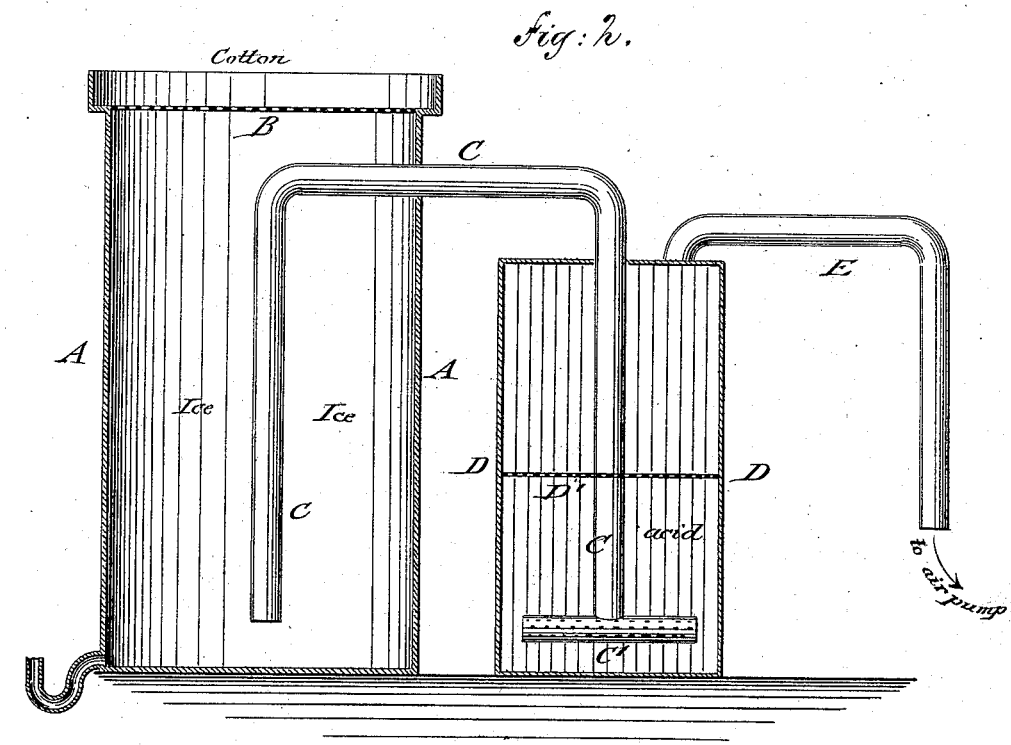
WITNESSES:
Carl Karp
Otto Risch
INVENTOR
Friedrich Ad. Bruns
By Paul Goepel.
ATTORNEY

UNITED STATES PATENT OFFICE.

FRIEDRICH A. BRUNS, OF NEW YORK, N. Y.

APPARATUS FOR PURIFYING AIR.

SPECIFICATION forming part of Letters Patent No. 229,374, dated June 29, 1880.

Application filed January 26, 1880.

*To all whom it may concern:*

Be it known that I, FRIEDRICH A. BRUNS, of the city, county, and State of New York, have invented certain new and useful Improvements in Apparatus and Methods for Purifying Air, of which the following is a specification.

In the accompanying drawings, Figure 1 represents a plan view, and Fig. 2 a vertical longitudinal section on line $x\ x$, Fig. 1, of my improved apparatus for purifying air.

Similar letters of reference indicate corresponding parts.

The object of this invention is to furnish means for cooling and purifying the atmospheric air which is required for handling beer, ale, wine, and other fermented liquors during fermentation. These liquids are at present transferred by means of air-compressing pumps from one cask to another, the air employed for forcing the liquids carrying microscopic organisms and inorganic impurities which impregnate the beer or other liquid and exert an injurious influence thereon. To prevent these organisms from entering the liquids I employ a cooling and purifying apparatus, through which the air is drawn by the air-pump, so that all inorganic and organic impurities are retained and destroyed, and thereby a perfectly pure air supplied for handling the liquids. Fermented liquors treated with air purified in such a manner keep better, become perfectly clear, and are not liable to deterioration.

My invention consists more especially of a cooling-chamber filled with ice and provided with a top screen covered with a layer of cotton or similar material, and of an acid-chamber, into which the air is drawn from the cooling-chamber and minutely divided therein by a perforated distributer and screen, to be then conducted off for use.

Referring to the drawings, A represents a cooling-chamber, which is filled with ice and provided at the bottom with a discharge-pipe for the ice-water and with a suitable water-seal.

At the upper part of the cooling-chamber is arranged a removable screen, B, and on the screen a layer of cotton or other fibrous material.

A connecting-pipe, C, extends from the lower part of the cooling-chamber in upward direction through the same and passes out near the upper part, and then downward into an acid-chamber, D, the pipe C having at the lower part a perforated distributer, C'.

The acid-chamber D is filled up to a certain height with a mixture of sulphuric and salicylic acids, or with any other acid capable of destroying microscopic organisms, and provided about midway of its height with a screen, D'. A second pipe, E, extends from the top of the acid-chamber to the air-pump, which draws the air by suction through the apparatus.

The air is first cleaned of all mechanically-adhering impurities by the cotton and then cooled off by the ice, it being of special advantage to bring the purified air at a lower instead of at the outer temperature into contact with the liquid. The air is then drawn into the acid-chamber, where it is minutely divided by the distributer C' through the acid. All microscopic organisms which are carried along by the air are by the action of the acids destroyed, the screen assisting in the more minute distribution of the air and preventing a too lively agitation of the acid, so that no particles thereof are carried off with the air. The air is then conducted through pipe E and through the air-pump to the place of use, taking the place of the impure atmospheric air at present employed in pumping beer, wine, or other fermented liquors from one cask to the other, and for other purposes.

As the fermented liquid comes only in contact with purified air it is not exposed to the deteriorating effects of the microscopic germs contained in the atmospheric air, so that the last stage of the fermentation can take place under more favorable circumstances. The fermented liquor so obtained keeps better in any climate, as it is not liable to be affected by changes of temperature and is perfectly clear in appearance.

I am aware that it is not new to use, in purifying air, filters, drying-chambers, and coolers, and I do not claim these broadly; but

I claim—

The combination, in a purifying and cooling apparatus, of the refrigerating-chamber A, its inlet B, covered with fibrous material, acid-vessel D, pipe communicating with the vessels A and D and terminating in an air-distributer, and outlet-pipe E, communicating with the vessel D, all as set forth.

In testimony that I claim the foregoing as my invention I have signed my name, in presence of two witnesses, this 12th day of January, 1880.

FRIEDRICH AD. BRUNS.

Witnesses:
PAUL GOEPEL,
CARL KARP.